United States Patent
Baur et al.

(10) Patent No.: US 6,488,138 B1
(45) Date of Patent: Dec. 3, 2002

(54) MULTI-DISK CLUTCH IN A POWER SPLIT TRANSMISSION

(75) Inventors: Erwin Baur, Friedrichshafen (DE); Helmut Konrad, Aulendorf (DE); Herbert Simon, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/720,354

(22) PCT Filed: Jul. 3, 1999

(86) PCT No.: PCT/EP99/04635

§ 371 (c)(1), (2), (4) Date: Dec. 21, 2000

(87) PCT Pub. No.: WO00/03151

PCT Pub. Date: Jan. 20, 2000

(30) Foreign Application Priority Data

Jul. 10, 1998 (DE) .......................... 198 30 951

(51) Int. Cl.$^7$ ................................ F16D 25/10
(52) U.S. Cl. ................ 192/87.15; 192/106 F; 192/113.35
(58) Field of Search .................. 192/21, 51, 48.8, 192/70.12, 70.28, 85 AA, 87.11, 87.15, 106 F, 113.35

(56) References Cited

U.S. PATENT DOCUMENTS

| | | | | |
|---|---|---|---|---|
| 3,313,171 A | * | 4/1967 | Nagasaki | 192/51 X |
| 3,834,503 A | * | 9/1974 | Maurer et al. | 192/113.35 |
| 4,134,483 A | * | 1/1979 | Horsch | 192/113.35 |
| 4,312,434 A | | 1/1982 | Ballendux | 192/87.17 |
| 4,458,797 A | | 7/1984 | Hawkins | 192/52 |
| 4,624,353 A | | 11/1986 | Sailer et al. | 192/70.12 |
| 4,827,784 A | * | 5/1989 | Muller et al. | 192/106 F |
| 4,936,165 A | * | 6/1990 | Doyle et al. | 475/72 |
| 4,947,974 A | * | 8/1990 | Smemo et al. | 192/106 F |
| 4,957,195 A | | 9/1990 | Kano et al. | 192/106 F |

FOREIGN PATENT DOCUMENTS

| | | | |
|---|---|---|---|
| DE | 1888458 | 2/1962 | |
| DE | 1 217 704 | 5/1966 | |
| DE | 6 602 134 | 12/1968 | |
| DE | 6 910 124 | 3/1969 | |
| DE | 22 15 922 | 10/1973 | |
| DE | 23 16 571 | 10/1973 | |
| DE | 34 32 403 C2 | 4/1985 | |
| DE | 34 44 103 A1 | 6/1986 | |
| DE | 43 24 809 A1 | 1/1995 | |
| DE | 195 22 833 A1 | 1/1997 | |
| DE | 197 42 644 A1 | 4/1998 | |
| EP | 0 692 649 A1 | 1/1996 | |
| EP | 0 718 517 A1 | 6/1996 | |
| JP | 2-42233 A | * 2/1990 | 192/113.35 |
| JP | 6-307542 A | * 11/1994 | 192/51 |
| WO | 95/03497 | 2/1995 | |
| WO | 97/01049 | 1/1997 | |

* cited by examiner

Primary Examiner—Richard M. Lorence
(74) Attorney, Agent, or Firm—Davis & Bujold, P.L.L.C.

(57) ABSTRACT

Multi-disk clutch connected downstream of a power split transmission consisting of a double clutch whose individual clutches rotate in opposite directions, the rotational-speed dependent axial forces being compensated on the shift piston, and has a valve which releases or blocks the flow of coolant to the disks and a return spring with an increasing spring characteristic line for calibrating the clutch.

12 Claims, 2 Drawing Sheets

MULTI-DISK CLUTCH IN A POWER SPLIT TRANSMISSION

FIELD ON THE INVENTION

The invention relates to a multi-disk clutch in a power split transmission for driving a mobile vehicle, especially a field tractor. The installation space, particularly the radial extent of the transmission, is limited wherefore the transmission housing must not exceed a maximum extension. The multi-disk clutch of the transmission is used to reverse the vehicle direction, it being possible for the operation to develop automatedly. At the same time, the clutch must be designed in a manner such that the closing force of the shift piston of the multi-disk clutch is independent of the rotational speed and a calibration of the clutch is possible. When the clutch is open, the drag losses of the disks must be kept at a low level, since in a multi-disk clutch used as reversing clutch, when a clutch is in open state the disks always have to be driven through in counter engine rotation.

BACKGROUND OF THE INVENTION

DE 195 22 833 has disclosed a power split transmission where two multi-disk clutches connected downstream of the power split part of the transmission are disposed in a manner such that by closing the first clutch KV and opening the second clutch KR, the vehicle is moved forward by closing the second clutch and opening the first clutch, the vehicle is moved in reverse. By arrangement of the clutches radially next to each other, a larger radial installation space is needed.

DE 34 32 403 has disclosed a multi-disk clutch designed as double clutch in which rotational-speed dependent hydraulic axial forces on the shift piston counteract the rotational-speed dependent hydraulic axial forces on a radially inwardly open compensating cylinder having a chamber filled to over flow with cooling oil. The oil fed to the compensating piston is also passed on to the compensating cylinder and via the disks escapes into the transmission. When the clutch is open, especially at low temperatures and due to the drag losses generated thereby in the multi-disk clutch, the degree of efficiency is also impaired.

The problem on which the invention is based is to provide a double clutch for a power spit transmission which stands out by a compact design, low number of parts, an improved degree of efficiency, the same as by the prevention of wobbling disks and the property of being automatedly shiftable.

SUMMARY OF THE INVENTION

According to the invention, this is achieved by the fact that the clutch used is a multi-disk clutch designed according to the double clutch principle, which is connected downstream of the power split part of the transmission and where both individual clutches rotate in opposite directions, which is obtained by using one countershaft connected downstream of the clutch driven in reverse. By said arrangement of the multi-disk clutch, a compact, space-saving solution is achieved. By this arrangement, the clutch can be used as reversing clutch to reverse the vehicle direction, as separating clutch by opening both disk set, as parking brake, as starting clutch and as brake for dynamic brake support by closing both disk sets. By using the double clutch as reversing clutch with separate clutches rotating in different directions, it is possible to construct the clutches so that when the clutches are open the drag torques produced by the disk sets compensate each other and thus no starting torque is produced upon the vehicle. It is further possible to mount all supplies and discharges in the central shaft which can also be used as torque-transmitting duct for other possible inputs, particularly the fluid for the volume of the compensating piston for compensation of the rotational-speed dependent axial forces can be delivered and discharged through the central shaft. By the fluid for the volume of the compensating piston for compensation of the rotational-speed dependent axial forces being returned through the central shaft, the degree of efficiency is improved in a manner such that the drained fluid is not passed through the disks and the drag torques and losses associated therewith are reduced. The connecting holes toward the shift piston, the same as to the compensating piston, are located radially at the same height thus ensuring that the rotational forces are exactly compensated. By surfaces of the same size on both sides of the shift piston being covered with fluid, the rotational-speed dependent axial forces reciprocally cancel each other. Due to the rotational-speed dependent axial forces on both sides of the shift piston, no additional drain valves are needed for the pressurized space of the shift piston. In addition, a valve can be provided in the clutch device which releases a fluid current for cooling the disks of the clutch only when the clutch becomes closed or is closed. In the open state, the valve closes the access for the fluid current to the disks which further reduces the drag torques thus improving the degree of efficiency. In order to automate the gear shift of the clutch, it is necessary that the clutch be calibrated for which purpose it must be possible to detect the point at which the disks touch each other but still transmit no torque. Therefore, in the invention is used a spring characteristic line which is composed of the spring tension for the resetting of the disks in such a manner that the characteristic line is always increasing. It is thus possible to coordinate with the control of the clutch a specific path of the piston for each clutch pressure or spring tension.

In order further to reduce the drag torque of the disks, it is necessary to keep the disks at a defined distance.

In this invention, therefore, the outer disks are easily kept by corrugated springs at a defined distance between the outer disks. By using corrugated springs, it is ensured that a wobbling of the disks be prevented which prevents as inadmissible heating of the disks.

BRIEF DESCRIPTION OF THE DRAWINGS

The invention will now be described, by way of example, with reference to the accompanying drawings in which:

FIG. 1 is a diagram of a driving mechanism where a power split transmission is shown. The central shaft 1, which is the input shaft of the transmission, drives the first planetary step of the drum selector gear 2, the hydrostatic adjustment unit 3 and on its side remote from the transmission input can be used as through drive. The multi-disk clutch 4 is situated in the axial elongation of the drum selector gear and the cylinder housing 5 is connected with the output of the drum selector gear. The inner disk carrier 6 of the reversing clutch 7 is connected with the output 9 of the transmission by a toothing via an intermediate shaft 8. The inner disk carrier 10 of the forward clutch 11 is directly connected with the output 9 by a toothing. If the reversing clutch 7 is closed and the forward clutch 11 is open, the output 9 is moved by the intermediate shaft 8 in a reverse rotating direction. If the forward clutch 11 and the reversing clutch 7 are closed, the power train is blocked.

FIG. 2 shows a practical example of a multi-disk clutch. Since the parts and operations of both separate clutches of the multi-disk clutch designed as double clutch are equal, only one clutch is described. The multi-disk clutch 4 surrounds the central shift 1 coaxially, the supply 12 for the pressurizing of the shift piston 13, the supply 14 for the rotational-speed dependent compensating forces, the same as the return 15 thereof and the supply 16 of the coolant, are situated in the central shaft 1. Via a transverse hole 17 with tapered cross-section in the central shaft 1, fluid from the supply 14 reaches via transverse hole 20 in the cylinder housing 5 into a space 18 which is limited by the shift piston 13 and the spring carrier 19. Due to the rotary motion of the cylinder housing 5, of the spring carrier 19 and of the shift piston 13, the fluid in the space 18 is likewise set to rotary motion and exerts a rotational-speed dependent force upon the shift piston 13 and the spring carrier 19 which is fixed upon the cylinder housing in axial direction. The fluid in the space 18 is drawn into the return lead 15 via a transverse hole 27 in the cylinder housing 5 and via a transverse hole 35 in the central shaft. Thus, the fluid is not drawn off through the disks and produces no additional drag losses in the disks. Via a transverse hole 21 in the central shaft 1, fluid reaches from the supply 12 via a transverse hole 22 in the cylinder housing 5 into a space 23 which is limited by the shift piston 13 and the cylinder housing 5. By the rotary motion of the cylinder housing 5 and of the shift piston 13, the fluid in the space 23 is likewise set in rotary motion and exerts a rotational-speed dependent force upon the shift piston 13. The rotational-speed dependent forces on both sides of the shift piston 13 reciprocally compensate themselves. If the pressure in the space 23 is raised, the shift piston 13 moves against the recoil force of the springs 24 in direction of the spring carrier 19 and brings to abutment the disks 25. If the pressure in the space 23 is high enough, a force-locking connection of cylinder housing 5 to toothing 26 is produced which is adequate to torque transmission. While the disks 25 are brought to abutment, due to the axial displacement of the shift piston 13, a valve 28 which abuts on the shift piston 13 is likewise displaced in axial direction and connects the supply 16 with the disks 25 via transverse hole 30, a transverse hole 31 and a transverse hole 32, the same as transverse holes 33 in the disk carrier 6. During the closing process of the clutch and in closed state, cold fluid reaches the disks 25. If the pressure in the space 23 is lowered, the shift piston 13 moves by virtue of the recoil force of the springs 24 in direction of the cylinder housing 5 and opens the disks 25. The valve 28 simultaneously shuts off the connection to the disks 25. In the open state, the disks are no longer traversed by cold fluid which reduces the drag losses and thus improves the degree of efficiency. The corrugated springs 34 between the disks 25 prevent a wobbling of the disks 25 and the disks 25 are held at their defined distance whereby the drag torques and heating of the disks are reduced and the degree of efficiency improved.

Figure 1:
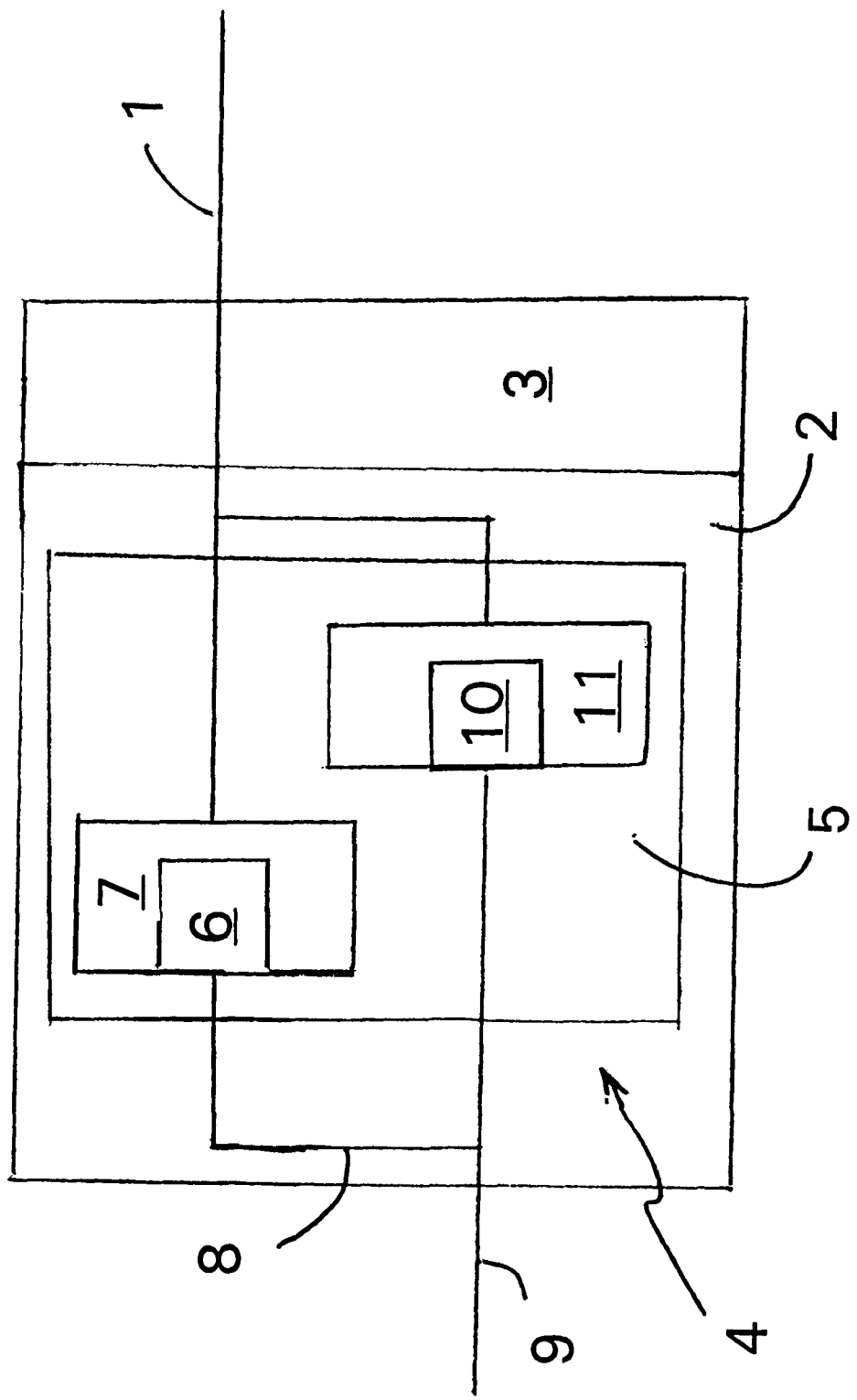
FIG. 1 is a diagram of a power split transmission driving mechanism.
Figure 2:
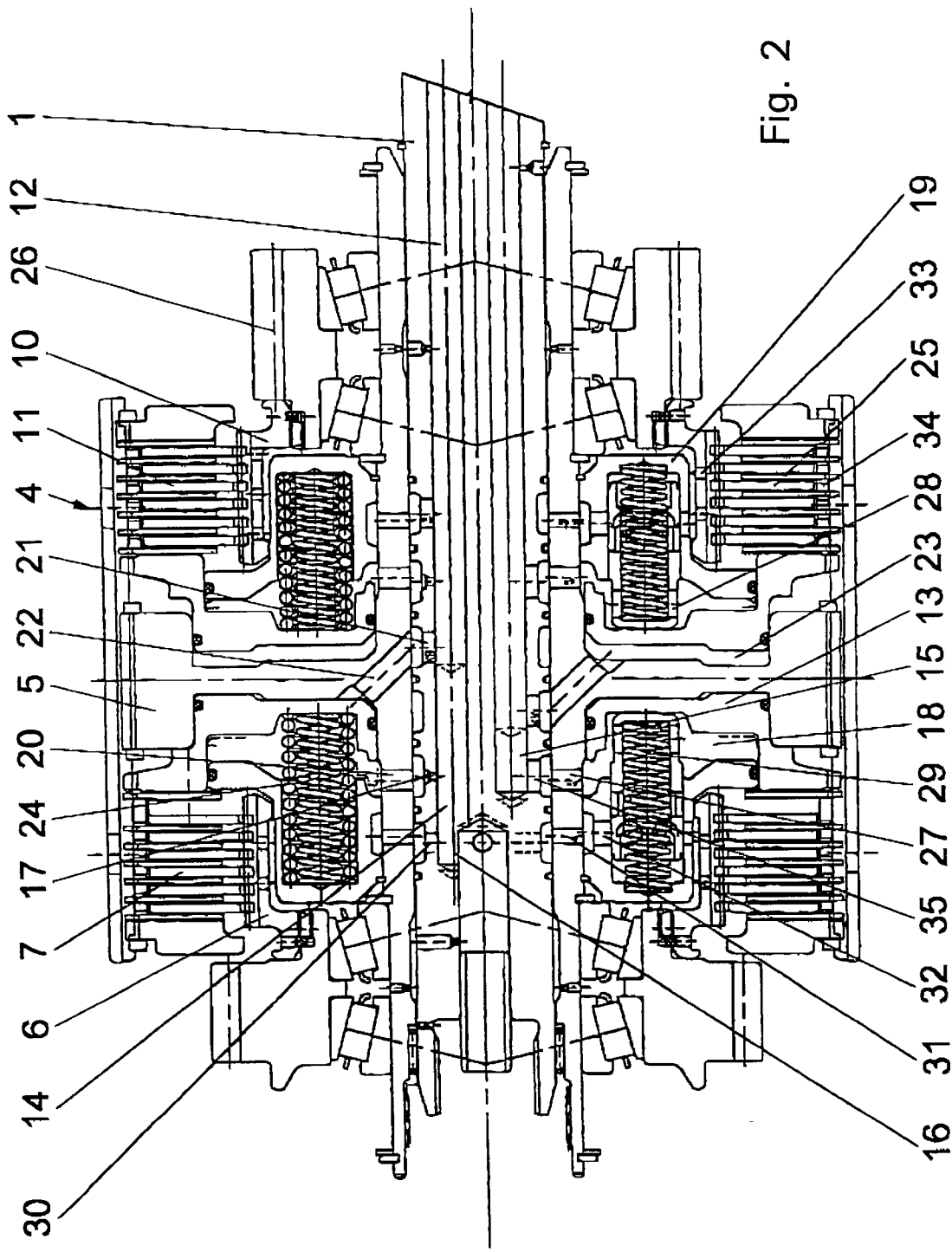
FIG. 2 shows an example of a multi-disk clutch.

Reference Numerals 1 central shaft
2 drum selector gear
3 adjustment unit
4 multi-disk clutch
5 cylinder housing
6 disk carrier
7 reverse clutch
8 intermediate shaft
9 output
10 disk carrier
11 forward clutch
12 supply
13 shift piston
14 supply
15 return movement
16 supply
17 transverse hole
18 space
19 spring carrier
20 transverse hole
21 transverse hole
22 transverse hole
23 space
24 springs
25 disks
26 toothing
27 transverse hole
28 valve
29 spring
30 transverse hole
31 transverse hole
32 transverse hole
33 transverse hole
34 corrugated spring
35 transverse hole

What is claimed is:

1. A power split transmission having for selecting the travel direction hydraulically actuated multi-disk clutches which are connected downstream of a power split part of said transmission in which a cylinder housing (5) accommodates a shift piston (13) which upon actuation is moved against a spring tension produced by springs (24) thus bringing to abut disks (25) with oil-cooled friction surfaces, wherein said multi-disk clutches for selecting the travel direction are combined to form a double clutch with common cylinder housing (5) which at the same time serves for torque transmission, said multi-disk clutches rotating in opposite directions.

2. The power split transmission having hydraulically actuated multi-disk clutches according to claim 1, wherein the rotational-speed dependent hydraulic axial forces on said shift piston (13) are compensated, clutch is closed, by rotational-speed dependent hydraulic axial forces on the opposite side of said shift piston (13) and that the fluid is supplied and returned in a space (18) opposite to the pressure chamber of said shift pistons via holes in a central shaft (1) within said cylinder housing (5).

3. The power split transmission having hydraulically actuated multi-disk clutches according to claim 2, wherein said space (18) which is opposite to a pressure chamber of said shift piston (13) has a fluid-tightening separation from said disks (25).

4. The power split transmission having hydraulically actuated multi-disk clutches according to claim 1, wherein each multi-disk clutch has one valve (28) actuated by said shift piston (13) which connects one hole in a central shaft (1), with fluid for cooling, with said disks (25) of said multi-disk clutch during the closing process of said multi-disk clutch and in closed state of said multi-disk clutches and cuts off said connection in open state of said multi-disk clutches.

5. The power split transmission having hydraulically actuated multi-disk clutches according to claim 1, wherein corrugated springs (34) between said disks (25) hold said disks (25) hold said disks (25) at a defined distance.

6. The power split transmission having hydraulically actuated multi-disk clutches according to claim 1, wherein the spring tension for resetting said shift piston (13) is always increasing.

7. A power split transmission comprising:

hydraulically actuated multi-disk clutches for selecting the travel direction which are connected downstream of a power split portion of said transmission;

a cylinder housing (5) within the transmission accommodates a shift piston (13) which upon actuation is moved against a spring bias produced by springs (24) to abut disks (25) with oil-cooled friction surfaces, a double clutch is formed by combining said multi-disk clutches for selecting the travel direction with the common cylinder housing (5) which at the same time serves for torque transmission, said multi-disk clutches rotating in opposite directions; and wherein rotational-speed dependent hydraulic axial forces acting on said shift piston (13) are compensated, when one of the clutches is closed, by opposing rotational-speed dependent hydraulic axial forces on the opposite side of said shift piston (13) and that a pressurized fluid is supplied and returned in a space (18) opposite to a pressure chamber of said shift pistons via holes in a central shaft (1) within said cylinder housing (5).

8. The power split transmission having hydraulically actuated multi-disk clutches according to claim 7, wherein said space (18) which is opposite to a pressure chamber of said shift piston (13) has a fluid-tightening separation from said disks (25).

9. The power split transmission having hydraulically actuated multi-disk clutches according to claim 7, wherein each multi-disk clutch has one valve (28) actuated by said shift piston (13) which connects one hole in a central shaft (1), with fluid for cooling, with said disks (25) of said multi-disk clutch during the closing process of said multi-disk clutch and in closed state of said multi-disk clutches and cuts off said connection in open state of said multi-disk clutches.

10. The power split transmission having hydraulically actuated multi-disk clutches according to claim 7, wherein corrugated springs (34) between said disks (25) hold said disks (25) hold said disks (25) at a defined distance.

11. The power split transmission having hydraulically actuated multi-disk clutches according to claim 7, wherein the spring tension for resetting said shift piston (13) is always increasing.

12. A power split transmission comprising:

hydraulically actuated first and second multi-disk clutches for selecting one of a forward and reverse travel direction, the first and second clutches are connected downstream of a power split portion of said transmission;

a cylinder housing (5) within the transmission accommodates a shift piston (13) which upon actuation is moved against a spring bias produced by springs (24) to abut disks (25) with oil-cooled friction surfaces, a double clutch is formed by combining said multi-disk clutches for selecting the travel direction with the common cylinder housing (5) which at the same time serves for torque transmission, said multi-disk clutches rotating in opposite directions; and wherein each of the first and second clutches provide the shift piston on one side with a pressure chamber and on an opposing side a compensating chamber and any rotational-speed dependent hydraulic axial forces acting on said shift piston (13) are compensated, when one of the first and second clutches is closed by pressurizing the pressure chamber, and an opposing rotational-speed dependent hydraulic axial force is imposed on the opposing compensating chamber and that a pressurized fluid actuating the shift piston is supplied and returned to a main pressure supply from the opposing compensating chamber (18) opposite of the pressure chamber of said shift piston via holes in a central shaft (1) within said cylinder housing (5).

\* \* \* \* \*